March 12, 1968    J. V. FISHER    3,372,960
SELF-LOCKING BUSHING
Filed Oct. 21, 1965
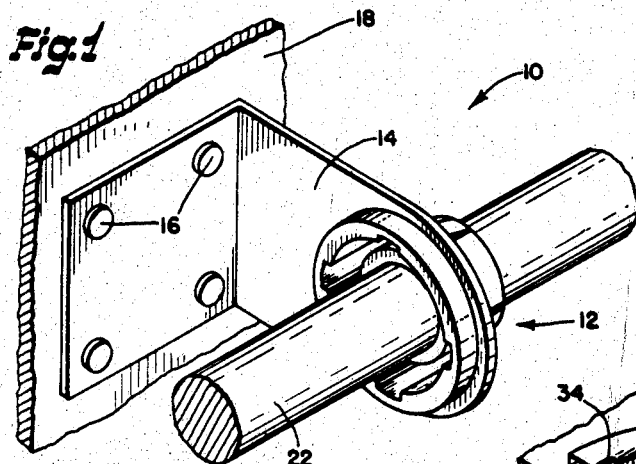
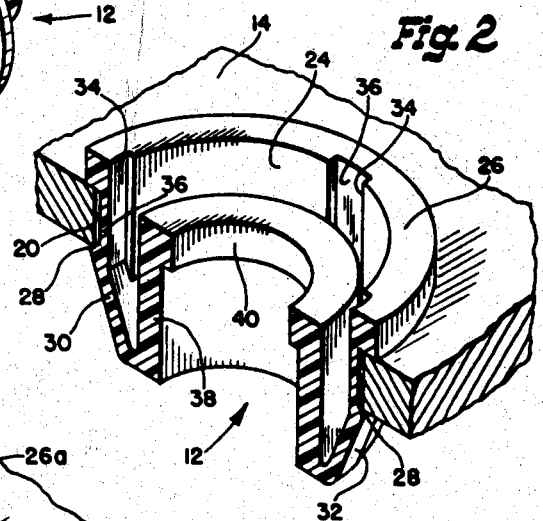
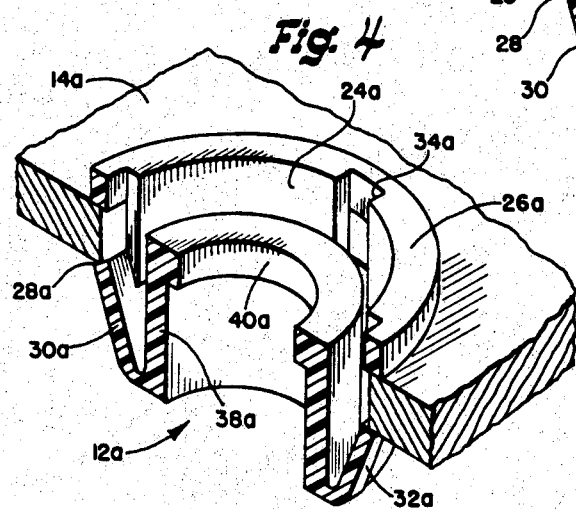
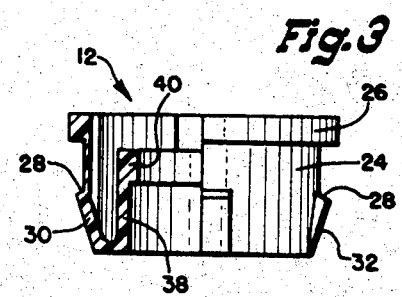
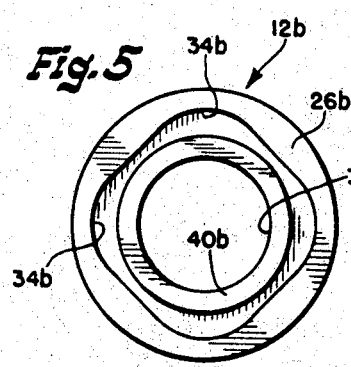
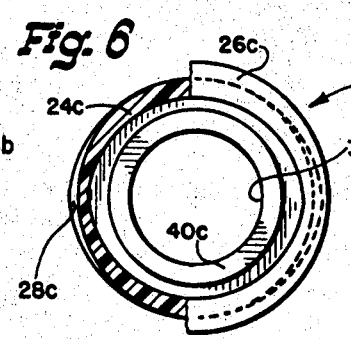
INVENTOR.
Julian V. Fisher
BY
His Att'ys United States Patent Office 3,372,960
Patented Mar. 12, 1968

3,372,960
SELF-LOCKING BUSHING
Julian V. Fisher, Carpentersville, Ill., assignor to Illinois Tool Works Inc., Chicago, Ill., a corporation of Delaware
Filed Oct. 21, 1965, Ser. No. 500,034
2 Claims. (Cl. 308—15)

ABSTRACT OF THE DISCLOSURE

This invention relates to a one-piece plastic bushing capable of being self-retained in an apertured workpiece for mounting a shaft in spaced relation within said apertured workpiece and capable of permitting radial and longitudinal movement of said shaft.

---

The present invention relates to a one-piece device for mounting a complementary member in a workpiece, and more particularly, to a self-locking bushing for mounting a rotatable or longitudinally movable shaft in an apertured workpiece.

Many commercial applications require a self-retaining device which mounts a rotational or longitudinally movable shaft in an apertured workpiece. As an example, it has been suggested that such devices can be used in mounting a control torque shaft operated by a gear shift lever. Numerous other uses will readily suggest themselves upon an understanding of the function and operation of the devices contemplated herein to be described in detail below.

The prior art is replete with various shaft mounting devices which are self-locking with respect to an apertured workpiece, but which do not permit rotational or longitudinal movement of the mounted shaft. Similarly, many shaft mounting devices have been developed affording desired shaft movement without readily accommodating themselves in a self-retaining fashion to an apertured workpiece. The present invention provides a novel bushing device which has both self-retention and shaft movement capability.

An important object of the present invention is the provision of a self-locking bushing for mounting a rotatable or longitudinally shiftable shaft in an apertured workpiece.

Another object of the present invention is the provision of a novel bushing which may be easily applied to an apertured workpiece, and which will thereafter be positively retained against removal from the workpiece.

A still further object of the present invention is the provision of a novel bushing device which, in addition to the foregoing objects, provides a shaft supporting section which is nondistortable both during and after installation within an apertured workpiece, and which also provides the proper space relationship of the shaft supporting section relative to the panel for effective, non-interrupting operation of the mounted shaft.

Yet another object of the present invention is the provision of a novel bushing made from a suitable tough resilient plastic material which reduces the effect of friction, and provides lubricity between relatively movable interfitting components.

Still another object of the present invention is the provision of a one-piece plastic bushing which, because of its configuration, can be accurately and economically manufactured by present molding techniques at a relatively low cost.

Other and further objects and advantages of the present invention will become apparent from the following description when read in connection with the accompanying drawing wherein:

FIG. 1 is a fragmentary perspective view showing an assembly including the bushing device incorporating features of the present invention;

FIG. 2 is an enlarged fragmentary perspective view, partially in section, of a modified form of bushing device, the present invention assembled to an apertured workpiece or panel;

FIG. 3 is an elevational view, partially in section, of the bushing device shown in FIGS. 1–2;

FIG. 4 is an enlarged fragmentary perspective view, partially in section, of a modified form of bushing device, coming within the purview of the present invention;

FIG. 5 is a top plan view of yet another modified form of bushing device coming within the scope of the present invention; and FIG. 6 is a top plan view, partially in section, of still another bushing device incorporating the principles of the present invention.

Referring now more specifically to the drawing, an assembly 10 is shown in FIG. 1 which includes a one-piece bushing or mounting device 12, the construction of which will be presently described. Although the particular assembly in which the bushing 12 is used may take various forms and serve widely differing functions, it is contemplated in the present discussion that the assembly 10 includes an apertured workpiece or panel 14 which is suitably supported by mounting screws 16 or the like to a supporting structure 18, the workpiece or panel 14 having an aperture 20 extending therethrough as best seen in FIG. 2 for accommodating the bushing 12. The bushing itself supports a control shaft or similar element 22 which is designed to be rotatable or longitudinally shiftable relative thereto.

The bushing or mounting device 12 is preferably molded in one piece from a tough, yet resilient plastic material such as nylon. The bushing 12, as depicted in FIGS. 1–3 of the drawing, comprises an elongated annular body or shank portion 24 adapted to extend through the workpiece aperture 20. The annular shank portion 24 includes suitable self-locking means for mounting the bushing within the aperture 20 of the panel 14 which are in the form of a confronting head portion 26, and a plurality of circumferentially spaced, radially inwardly flexible abutment or shoulder elements 28 axially spaced from the undersurface of the head portion 26 by a distance approximating that of the workpiece or panel thickness. It will be noted that head portion 26 and the abutment or shoulder elements 28 project laterally outwardly a sufficient amount to engage opposite sides or faces of the panel 14 when the bushing 12 is assembled thereto as best seen in FIG. 2.

In order to facilitate initial entry of the bushing 12 into the workpiece aperture 20, the annular body or shank portion 24 is preferably provided with a tapering entering end section 30 beneath each of the abutment or shoulder element 28, the outer surface 32 of each end section 30 diverging upwardly and merging with the respective abutment or shoulder element 28 with which it is associated. The entering end section 30 also promotes radial collapse of the shank or body portion 24 in the vicinity of the abutment or shoulder element 28 since it will be recognized that each outer surface area 32 projects laterally outwardly an amount greater than the wall sections of the shank or body portion 24 intermediate adjacent abutment elements, and diverges upwardly and outwardly to its area of merger with its abutment element 28. In the FIGS. 1–3 embodiment, there are four abutment elements 28 positioned in quadrature or disposed 90 degrees from one another such that the maximum transverse dimension in the lower section of annular body member 24 is the distance between the outer peripheral areas of a pair of opposed abutment elements 28 which are located 180 degrees from each other.

When mounting the bushing within the apertured workpiece 14, the outer wall surfaces 32 of each entering end section 30 will first engage the marginal portion surrounding the aperture 20, and due to the inherent resiliency of the plastic material from which the bushing 12 is made, the abutment elements 28 will yield or flex radially inwardly to permit the bushing 12 to be passed through the workpiece aperture 20. Axial insertion of the bushing 12 within the workpiece aperture is continued until the undersurface of the confronting head portion 26 engages the upper side or face of the panel 14 at which time the abutment elements 28 will be in a position at least partially below the lower side or face of the panel 14. This will enable the abutment elements to spring radially outwardly with a snap action to project beneath the rear face or side of the panel for mounting the bushing 12 therein. The snap action referred to is derived from the inherent resiliency of the material and the structural features of the abutment elements 28 in relation to the size of the workpiece aperture 20 for mounting the bushing 12 in a self-locking manner with respect to the panel 14.

As a further feature promoting radial collapse of the annular body or shank portion 24 in the vicinity of the abutment elements 28 as it is applied to a workpiece or panel 14, the body or shank portion 24 is initially formed with a plurality of axially extending notches 34 which project radially outwardly from the internal wall surface of the body or shank section 24, and which are aligned with the abutment elements 28 to provide a series of spaced thinned sections 36 extending immediately above each of the abutment elements 28. It will be appreciated that the thinned sections 36 immediately above each abutment element 28 will offer less resistance to radial collapse as the bushing 12 is applied to the panel 14, thus promoting easier flexing of the abutment elements 28 and facilitating installation of the bushing 12 within the panel.

As an important feature of the present invention, there is provided an integral, reversely directed hollow shaft supporting section 38 which extends from the entering end of the annular body member or shank portion 24 and is positioned internally thereof. The free end of the hollow shaft supporting section 38 preferably terminates within the confines of the annular body or shank portion 24 as is best illustrated in FIG. 3 of the drawing. Adjacent the free end of section 38, a radially inwardly offset circumferential foot 40 is provided, the internal wall surface of which is adapted to engage a shaft such as control shaft 22 when mounted therein.

It is to be noted that the hollow shaft supporting section 38 from its connection with the hollow body member or shank portion 24 to its free end is laterally spaced from the annular body member 24 for mounting a shaft member in spaced relationship to the apertured workpiece. This lateral spacing also prevents distortion to the hollow shaft supporting section 38 both during and after installation of the bushing 12 within the panel aperture, and allows for a substantially uniform cross-sectional configuration of the section 38 to be formed, thereby preventing out-of-round and other irregular formations.

It is also important that the mounted shaft be supported by the bushing 12 such that the shaft extends substantially normal to the workpiece or panel, and to accomplish this, the hollow shaft supporting section 38, as well as its circumferential inwardly directed foot 40, extend substantially normal to the confronting head portion 26 in order to position these parts in the proper attitude, namely, in a direction substantially normal to the plane of the workpiece or panel 14 when the bushing 12 is applied thereto. In this manner, a shaft such as control shaft 22 will be supported in the proper attitude relative to the workpiece or panel 14 to reduce the possibility of interfering engagement of the hollow shaft supporting section with the internal wall surface of the annular hollow body member 24.

Attention is now directed to FIG. 4 of the drawing for a modified form of the present invention. This modified form is generally similar to the embodiment shown in FIGS. 1–3 as indicated by the application of identical reference numerals with the suffix "a" employed to designate like parts. The bushing 12a shown in the FIG. 4 embodiment is substantially identical with the FIGS. 1–3 embodiment with the exception that the relief notches 34a are form with the exception that the relief notches 34a are deep enough beneath the confronting head portion 26a to leave openings, instead of thinned sections, immediately above the abutment elements 28a. This construction will free the abutment elements 28a to permit even easier radial flexing of the same than the previously described embodiment as the bushing 12a is applied to the panel 14a. Also, this construction enables the abutment elements 28a to underlie the rear or side face of the panel 14a by a greater amount to enhance the locking effectiveness of the bushing 12a when assembled to the panel 14a.

Referring to FIG. 5 of the drawing, it will be seen that the bushing there shown is generally similar to the previously described embodiment, particularly the FIGS. 1–3 form, as indicated by the application of identical reference numerals with the suffix "b" employed in connection therein. The only substantial difference between the FIG. 5 and FIGS. 1–3 embodiment is that the weakened areas or relief notches 34b are part of a flowing, curvilinear design which provides relatively thicker wall sections in the area intermediate adjacent relief notches 34b. The relief notches 34b are, as in the FIGS. 1–3 embodiment, positioned in alignment with the abutment elements (not shown) so as to provide thin sections immediately thereabove and promote radial collapse of the annular body member (also not shown) when inserted within a panel structure.

In FIG. 6 of the drawing, the last illustrated embodiment is shown, and this bushing is generally similar to the previously described forms, and for this reason similar reference numerals with the addition of suffix "c" are employed to designate like parts. In this embodiment of the invention, the annular body or shank portion 24c is generally cylindrical in form, but having a generally oval or elliptically shaped shoulder 28c with its major axes greater than the maximum transverse dimension of the workpiece aperture with which it is associated to enable the peripherally continuous elliptically shaped shoulder 28c to extend laterally outwardly from the shank portion 24c and project behind the rear face or side of the panel after being passed therethrough due to the inherent resiliency of the material from which the bushing 12c is formed as in the previous embodiments.

It will be appreciated that various modifications of the various bushing designs illustrated in the drawing may be made without departing from the scope of the present invention. As an example, in the forms of the bushing which employ a plurality of circumferentially spaced abutment elements, the number of such abutment elements on a particular bushing may be varied to suit the particulars required. It will also be apparent that the shape or configuration of either the annular hollow body member or the hollow shaft supporting section is not limited to the cylindrical or elliptical shape illustrated in the drawing, but also may be varied for a particular environment or assembly.

From the foregoing description, it will now be apparent to those skilled in the art that a novel self-locking bushing or mounting device has been disclosed which also enables the mounting of a rotatable or longitudinally shiftable shaft element therein. The ease with which the bushing can be assembled to a panel structure, its locking effectiveness, and the disposition of the mounted shaft relative to the bushing and the panel structure all go toward creating a very desirable product having many commercial applications.

While I have shown and described certain embodiments of my invention it is with full awareness that any modifications thereof are possible. The invention is, therefore, not to be restricted except as is necessitated by the prior art and by the spirit of the appended claims.

What is claimed is:

1. One-piece plastic bushing for mounting a shaft in spaced relation to an apertured workpiece in which said bushing is positioned, comprising a continuous annular body member insertable within a workpiece aperture including radially inwardly flexible lock means for mounting said body member to said workpiece, and a circumferentially continuous integral, reversely directed hollow shaft supporting section extending from one end of said annular body member and positioned internally thereof, said shaft supporting section from its connection with said annular body member to its free end being laterally spaced from said annular body member for maintaining a shaft member in spaced relation to the apertured workpiece, a head extending radially outwardly from the end of said annular body member opposite to the one end connected to said shaft supporting section, said flexible lock means including a plurality of laterally extending shoulder surfaces circumferentially spaced about the outer surface of said annular body member and being longitudinally spaced from said head a distance sufficient to engage opposite sides of the apertured workpiece, a thinned wall section formed in said annular body member in the vicinity of each discrete shoulder surface to facilitate radial flexing thereof as the bushing is moved through said aperture, said hollow shaft supporting section being substantially uniform in cross section throughout its length and having at the free end thereof a circumferential foot extending radially inwardly with its inner surface offset from the internal wall of said hollow supporting section to provide a limited bearing surface for said shaft.

2. The bushing as set forth in claim 1 wherein said flexible laterally extending shoulder has an elliptical cross-sectional configuration at least prior to being applied to the workpiece aperture, the major axes of which is greater than the maximum transverse dimension of said aperture to enable said shoulder to project beyond the rear face of said workpiece aperture after being passed therethrough.

References Cited

UNITED STATES PATENTS

| | | | |
|---|---|---|---|
| 1,923,892 | 8/1933 | Skillman | 308—26 X |
| 2,244,977 | 6/1941 | Hansman | 16—2 X |
| 2,424,757 | 7/1947 | Klumpp | 85—80 X |
| 2,495,252 | 1/1950 | Hansen. | |
| 2,544,541 | 3/1951 | McCanty. | |
| 2,654,641 | 10/1953 | Veatch | 308—15 X |
| 2,823,962 | 2/1958 | Leonard | 308—26 |
| 2,836,214 | 5/1958 | Rapata | 85—80 |
| 2,840,816 | 6/1958 | Cejka. | |
| 2,912,712 | 11/1959 | Shomban | 16—2 |
| 2,946,612 | 7/1960 | Ahlgren | 85—80 X |
| 3,200,694 | 8/1965 | Rapata | 16—2 X |
| 3,213,494 | 10/1965 | Mayers | 85—80 |
| 3,227,992 | 1/1966 | Strong | 174—153 X |
| 3,243,206 | 3/1966 | Samer | 174—65 |
| 3,272,461 | 9/1966 | Larkin | 174—153 |

FOREIGN PATENTS 1,153,836   3/1958   France.

MARTIN P. SCHWADRON, *Primary Examiner.*

L. L. JOHNSON, *Assistant Examiner.*